(12) United States Patent
Wang

(10) Patent No.: US 12,486,529 B2
(45) Date of Patent: Dec. 2, 2025

(54) CENTRIFUGAL REACTION DEVICE AND CENTRIFUGAL REACTION METHOD

(71) Applicant: Chin Hung Wang, Taipei (TW)

(72) Inventor: Chin Hung Wang, Taipei (TW)

( * ) Notice: Subject to any disclaimer, the term of this patent is extended or adjusted under 35 U.S.C. 154(b) by 406 days.

(21) Appl. No.: 17/922,206

(22) PCT Filed: Dec. 1, 2020

(86) PCT No.: PCT/CN2020/133038
§ 371 (c)(1),
(2) Date: Oct. 28, 2022

(87) PCT Pub. No.: WO2022/115981
PCT Pub. Date: Jun. 9, 2022

(65) Prior Publication Data
US 2023/0257797 A1    Aug. 17, 2023

(51) Int. Cl.
*C12Q 1/6806* (2018.01)
*B03C 1/033* (2006.01)
(Continued)

(52) U.S. Cl.
CPC .......... *C12Q 1/6806* (2013.01); *B03C 1/0332* (2013.01); *B03C 1/288* (2013.01);
(Continued)

(58) Field of Classification Search
CPC ............. G01N 33/543; G01N 35/0098; C12Q 1/6806; B03C 1/0332; B03C 1/288; B03C 1/30; B03C 2201/18; C12N 15/1013
(Continued)

(56) References Cited

U.S. PATENT DOCUMENTS 8,703,070 B1 * 4/2014 Parng ................ B01L 3/502738
436/805
2006/0040273 A1    2/2006 Chaiken et al.
(Continued)

FOREIGN PATENT DOCUMENTS

CN         103575880         2/2014
CN         105675857         6/2016
(Continued)

OTHER PUBLICATIONS

Xiao et al, CN 106199022 B, English machine translation, pp. 1-7 (Year: 2018).*
(Continued)

*Primary Examiner* — Claire A Norris
(74) *Attorney, Agent, or Firm* — Branch Partners PLLC; Bruce E. Black

(57) ABSTRACT

A centrifugal reaction device includes: a centrifugal disk including a centrifugal shaft and at least one centrifugal holder, with the centrifugal holder disposed annularly about the centrifugal shaft; and at least one magnetic block disposed on at least one side of the centrifugal holder, wherein the centrifugal holder detachably holds a reaction tube, and the reaction tube contains magnetic beads, wherein the magnetic beads move within the reaction tube under a force of the sum of a magnetic force of the magnetic block and a centrifugal force. Therefore, a reaction mixture is blended quickly and sufficiently to facilitate a reaction. With the magnetic beads adsorbing a product, a valve of the reaction tube opens under the centrifugal force to discharge a waste liquid and reduce consumption of consumables of the reaction tube.

19 Claims, 8 Drawing Sheets

(51) Int. Cl.
*B03C 1/28* (2006.01)
*B03C 1/30* (2006.01)
*C12N 15/10* (2006.01)
*G01N 33/543* (2006.01)
*G01N 35/00* (2006.01)

(52) U.S. Cl.
CPC ............ *B03C 1/30* (2013.01); *C12N 15/1013* (2013.01); *G01N 33/543* (2013.01); *G01N 35/0098* (2013.01); *B03C 2201/18* (2013.01)

(58) Field of Classification Search
USPC ........................................................ 210/695
See application file for complete search history.

(56) References Cited

U.S. PATENT DOCUMENTS

| | | | |
|---|---|---|---|
| 2008/0035579 A1* | 2/2008 | Lee | G01N 35/00069 210/695 |
| 2008/0308160 A1 | 12/2008 | Boege et al. | |
| 2010/0227379 A1 | 9/2010 | Wo et al. | |
| 2011/0020194 A1 | 1/2011 | Lee et al. | |
| 2020/0246797 A1 | 8/2020 | Kim | |

FOREIGN PATENT DOCUMENTS

| | | | |
|---|---|---|---|
| CN | 106226526 | | 12/2016 |
| CN | 106199022 B | * | 11/2018 ............ B01D 43/00 |
| CN | 210090482 | | 2/2020 |
| CN | 211741324 | | 10/2020 |
| JP | 2009300433 A | * | 12/2009 |
| TW | I708057 | | 10/2020 |

OTHER PUBLICATIONS

Hiramatsu et al, JP 2009300433 English machine translation, pp. 1-78 (Year: 2009).*
International Search Report for PCT Application No. PCT/CN2020/133038 mailed Aug. 26, 2021.
Written Opinion for PCT Application No. PCT/CN2020/133038 mailed Aug. 26, 2021.
Extended European Search Report for EP Application No. 20963830.3 mailed Jun. 1, 2023.
Office Action for Japanese Patent Application No. 2022-580169 mailed Jan. 19, 2024 (Original and translation).
Office Action for Japanese Patent Application No. 2022-580169 mailed Jul. 29, 2024 (Original and translation).

* cited by examiner

CENTRIFUGAL REACTION DEVICE AND CENTRIFUGAL REACTION METHOD

CROSS-REFERENCE TO RELATED APPLICATIONS

This present application is a U.S. national stage application of PCT Application No. PCT/CN2020/133038, filed Dec. 1, 2020, which is hereby incorporated by reference in its entirety.

BACKGROUND OF THE INVENTION

Field of the Invention

The present disclosure relates to a reaction device and a reaction method which serve experimental purposes and, more particularly, to a centrifugal reaction device and a centrifugal reaction method which are effective in carrying out a molecular biological assay under a centrifugal force and a magnetic force in a one-touch manner.

Description of the Prior Art

Owing to advancements in biotechnology, there is an increasingly great demand for carrying out assays with biochemical and molecular biological methods. Existing commercially-available devices for carrying out nucleic acid extraction with magnetic beads fall into two categories as follows:
1. Magnetic bars: A magnetic bar and a magnetic bar sleeve outside the magnetic bar move vertically within a reaction tank back and forth while rotating, thereby stirring a reaction mixture therein. Then, the reaction mixture, magnetic beads and the magnetic bar sleeve are collectively moved out of the reaction tank in order to be moved into another reaction tank to undergo a subsequent reaction. The magnetic beads and the magnetic bar sleeve have to move into and out of the reaction tanks consecutively, leading to a lengthy processing process and a contamination risk. Furthermore, the magnetic bar sleeve and reaction tanks used in the reaction process are consumables and thus have to be replaced as needed, thereby adding to cost.
2. Magnetic blocks: With magnetic blocks positioned peripherally, and the magnetic beads disposed in micropipettes, the micropipettes move the solution vertically to and fro to blend the solution in order for the reaction to occur. The magnetic beads have to be adsorbed into the micropipettes by the peripheral magnetic blocks in order for the reaction mixture to be moved into different reaction tanks to undergo a reaction. The magnetic beads and the micropipettes have to move into and out of the reaction tanks consecutively, leading to a lengthy processing process and rendering massive operation impossible. Furthermore, the special micropipettes and reaction tanks used in the reaction process are consumables and thus have to be replaced as needed, thereby adding to cost.

Therefore, the presence of a huge number of samples or specimens necessitates the provision of extraction or analysis devices which operate speedily and efficiently and are cost-saving. However, existing commercially-available extraction or analysis devices take time to operate, include plenty consumables, and cannot carry out all molecular biological reactions in a one-touch manner.

SUMMARY OF THE INVENTION

In view of the aforesaid drawbacks of the prior art, it is a purpose of the disclosure to provide a centrifugal reaction device. By a design of a magnetic block, during a centrifugal process, magnetic beads in the reaction tube are subjected not only to a centrifugal force but also to a magnetic force of the magnetic block. The magnetic beads move within the reaction tube under a force of the sum of the magnetic force of the magnetic block and the centrifugal force. The movement of the magnetic beads causes a reaction mixture in the reaction tube to move in different directions and thus become sufficiently mixed. Moreover, the design of the reaction tube enables a check valve to open under the centrifugal force and allows the magnetic beads to adsorb a product, so as to discharge a waste liquid. Therefore, the centrifugal reaction device is advantageous in that extraction, reactions, wash and/or signal assays occur in the same reaction microtube, reducing the quantitative demand for the reaction tubes.

In order to achieve another purpose of the present disclosure, an embodiment of the disclosure provides a centrifugal reaction device, comprising:
 a centrifugal disk comprising a centrifugal shaft and at least one centrifugal holder, with the centrifugal holder disposed annularly about the centrifugal shaft;
 at least one magnetic block disposed on at least one side of the centrifugal holder,
 wherein the centrifugal holder detachably holds a reaction tube, and the reaction tube contains magnetic beads,
 wherein the magnetic beads move within the reaction tube under a force of the sum of a magnetic force of the magnetic block and a centrifugal force.

Preferably, the magnetic block and the centrifugal disk are not connected and thus do not move together.

Preferably, the magnetic block is an electromagnet, a magnet or a combination thereof.

Preferably, the magnetic block and the centrifugal disk are connected and thus move together.

Preferably, the electromagnet is disposed in the magnetic block.

Preferably, the magnetic block and the centrifugal holder are spaced apart by a distance of 0-300 mm.

Preferably, the centrifugal force measures 1-80,000 g.

Preferably, the magnetic force of the magnetic block measures 1-15,000 Gauss.

Preferably, the reaction tube comprises at least one reaction region and at least one check valve.

Preferably, the check valve of the reaction tube is electrically controlled or magnetically controlled to open and shut.

Preferably, the magnetic beads are coated with biological molecules including antibodies, aptamers, peptides and nucleic acid.

For still another purpose of the present disclosure, an embodiment thereof provides a centrifugal reaction method, comprising the steps of:
 introducing a specimen and/or a reaction reagent into at least one reaction region of a reaction tube in the centrifugal reaction device to form a reaction mixture;
 introducing magnetic beads into the reaction region;
 performing a centrifugal process on the reaction tube under a first centrifugal force to start a first reaction, wherein the magnetic beads move within the reaction tube under a force of the sum of a magnetic force of the magnetic block and a centrifugal force;
 performing a centrifugal process on the reaction tube under a second centrifugal force to open a first check valve and thereby discharge a waste liquid of the first reaction, wherein the second centrifugal force is greater than the first centrifugal force.

Preferably, the method further comprises introducing wash buffer to remove impurities.

Preferably, the method further comprises recovering a product from the magnetic beads.

Preferably, the magnetic beads are coated with biological molecules including antibodies, aptamers, peptides or nucleic acids.

Preferably, the magnetic beads are coated with silicon dioxide.

Preferably, the product is deoxyribonucleic acid (DNA) or ribonucleic acid (RNA).

Preferably, polymerase chain reaction can be performed in the reaction region.

Preferably, nucleic acid hybridization can be performed in the reaction region.

The above and other purposes, features, and advantages of the disclosure will become clear when reference is made to the following description, preferred embodiments, and accompanying drawings.

BRIEF DESCRIPTION OF THE DRAWINGS

The detailed description below contains plenty specific details to render the embodiments of the disclosure completely comprehensible. However, obviously, one or more embodiments can be implemented in the absence of the specific details. In another situation, well-known structures and process flows are schematically shown in accompanying drawings for the sake of brevity.

DETAILED DESCRIPTION OF THE EMBODIMENTS

Figure 1:
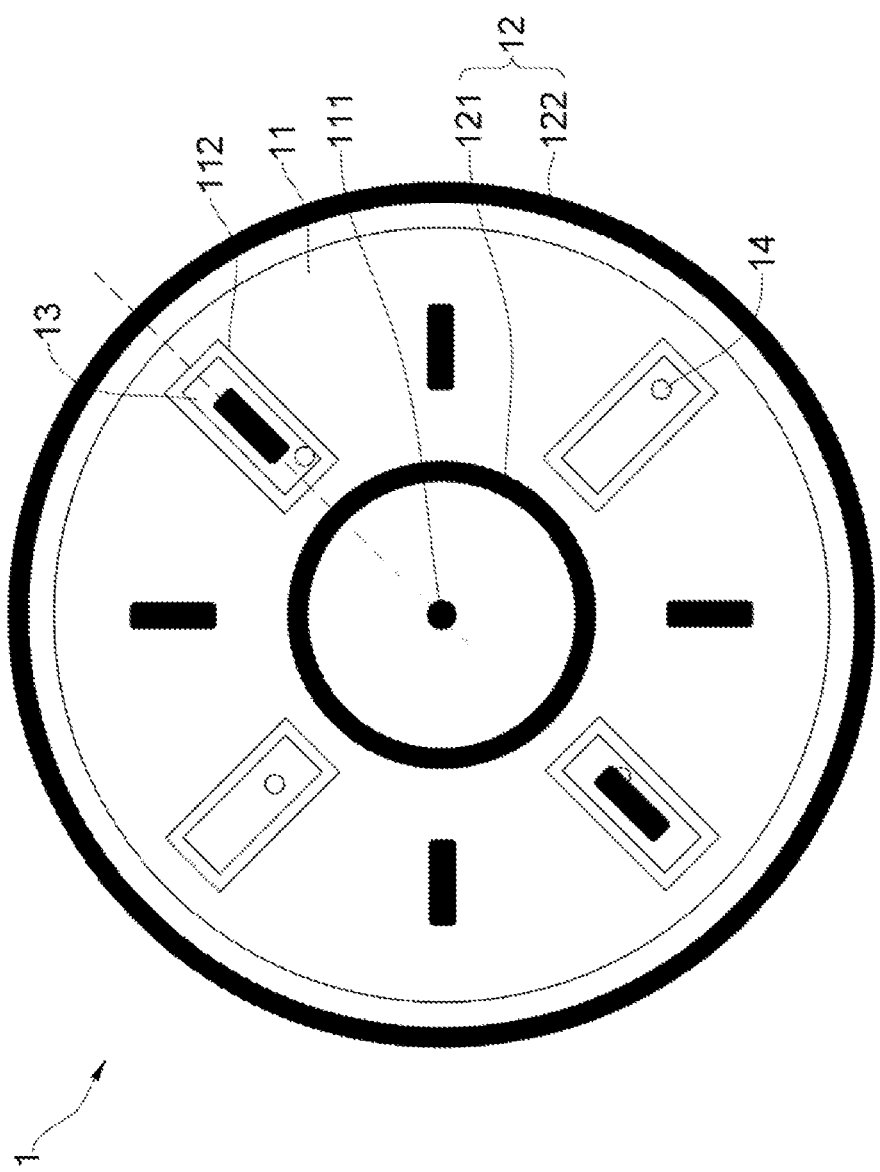
FIG. 1 is a top view of a centrifugal reaction device according to the first embodiment of the disclosure.

Embodiments of the disclosure are herein described with reference to accompanying drawings. The embodiments may be implemented in different forms which shall not be interpreted to place any limitations on the implementation or application of the specific embodiments of the subject matters claimed by the disclosure. The embodiments disclose features of specific embodiments as well as method steps and sequences thereof for constructing and operating the specific embodiments. However, identical or equivalent functions and step sequences may be achieved by any other specific embodiments. The embodiments enable the disclosure to be thoroughly and completely disclosed to fully communicate the spirit of the disclosure to persons skilled in the art. Like components shown in the accompanying drawings are denoted with like reference numerals/signs. Well-known functions and structures are, for the sake of brevity, not described in detail herein.

Unless otherwise defined, all the technical terms and jargon used herein are generally comprehensible to persons skilled in the art. In the event of a conflict between the meanings of the technical terms and jargon and the skilled persons' understanding of the technical terms and jargon, this specification (inclusive of definitions) shall prevail.

Each singular noun used herein shall be interpreted to include the plural form of the noun, and each plural noun used herein shall be interpreted to include the singular form of the noun, unless the consequence contradicts the context. Furthermore, the expressions "at least a," "at least one" and "one or more" used herein carry the same meaning and mean "one, two, three or more."

The conjunction "consisting essentially of" is used herein to define a composition, method or device, including a material, step, feature, constituent or component other than what are expressly specified herein, and is restricted to a usage scenario where the additional material, step, feature, constituent or component does not significantly affect the essential and novel features of the claimed invention. The scope of the object of the conjunction "consisting essentially of" lies between the scope of the object of the conjunction "comprises" and the scope of the object of the conjunction "consisting of."

Although all the numerical ranges and parameters used herein are intended to be approximate, related numerical values disclosed in the specific embodiments are presented herein as precise as possible. However, the numerical values each inherently and inevitably come with standard deviations caused by an individual test method. The adjective "approximate," used herein generally refers to the fact that a numerical value disclosed in a specific embodiment may actually be maximally 10%, maximally 5%, maximally 1% or maximally 0.5% greater or less than the numerical value disclosed in the specific embodiment. Alternatively, the adjective "approximate," used herein generally refers to the fact that the numerical value actually falls within an acceptable standard deviation of the mean, depending on a design choice made by persons skilled in the art. Unless otherwise specified, all the ranges, numbers, numerical values and percentages (for example, descriptive of the quantity of a material in use, duration, temperature, operation criteria, ratios and the like) disclosed herein are intended to be approximate and thus are not restricted to the embodiments. Therefore, unless stated conversely, all the numerical values and parameters disclosed herein are approximate and subject to changes as needed. At the least the numerical values and parameters shall be interpreted to be governed by conventional rules for significant figures and numeral systems. The numerical ranges disclosed herein are each defined from an endpoint to another endpoint or defined between two endpoints. Unless otherwise specified, the numerical ranges disclosed herein each comprise endpoints.

An embodiment provides a centrifugal reaction device comprising a centrifugal disk and at least one magnetic block. The centrifugal disk comprises a centrifugal shaft and at least one centrifugal holder. In a preferred embodiment, the centrifugal shaft is disposed at the center of the centrifugal disk. When a driving force is transmitted to the centrifugal shaft to drive the rotation of the centrifugal disk, the centrifugal disk stays stable and does not shift. In an embodiment, the centrifugal holder is disposed annularly about the centrifugal shaft and moves in response to the rotation of the centrifugal disk.

In an embodiment, the magnetic blocks are disposed on at least one side of the centrifugal holder. In an embodiment, the magnetic blocks are disposed on an inner side, outer side, upper side, lower side, lateral side or a combination thereof of the centrifugal holder. In a specific embodiment, the magnetic blocks disposed on the inner side, outer side and lateral side of the centrifugal holder lie on a horizontal plane passing through the centers of the reaction tubes, whereas the magnetic blocks disposed on the upper side and lower side of the centrifugal holder lie over and under the horizontal plane of the reaction tubes, respectively.

In an embodiment, the centrifugal holder of the centrifugal reaction device detachably holds the reaction tubes, and the reaction tubes contain magnetic beads. In an embodiment, the magnetic beads move within the reaction tubes under a force of the sum of a magnetic force of the magnetic block and a centrifugal force. Therefore, the direction and speed of the movement of the magnetic beads depends on a force which the magnetic beads are subjected to, which is the sum of a magnetic force and a centrifugal force. The expression "a magnetic force direction of the magnetic blocks toward the magnetic beads" used herein means the direction in which a force acts on the magnetic beads as a result of a magnetic field of the magnetic blocks. The expression "a magnetic force magnitude of the magnetic blocks toward the magnetic beads" used herein means the magnitude of a force acting on the magnetic beads as a result of a magnetic field of the magnetic blocks. In a preferred embodiment, transformation of a magnetic force direction or magnitude of the magnetic blocks toward the magnetic beads occurs.

In an embodiment, the reaction tubes are disposed at the centrifugal holder and moved together with the centrifugal holder. In a preferred embodiment, the centrifugal holder detachably holds the reaction tubes. A specimen or reagent is manually or mechanically introduced into the reaction tubes, and then the reaction tubes are mounted on the centrifugal holder to undergo a centrifugal process. It is only when reactions are done that the centrifugal process will terminate. The termination of the centrifugal process is not followed by the dismounting of the reaction tubes but is followed by a product assay or collection. Alternatively, the termination of the centrifugal process is followed by the manual or mechanical dismounting of the reaction tubes from the centrifugal holder and an ensuing product assay or collection. In a feasible embodiment, the reaction tubes each have a feeding port and a dispensing port which are connected to a feeding pipe and a dispensing pipe, respectively. The specimen or reagent is passed through the feeding pipe and then introduced into the reaction tube via the feeding port. A waste liquid or product is passed through the dispensing port and then discharged from the reaction tube via the dispensing pipe. In this situation, the reaction tubes are not necessarily dismounted from the centrifugal holder. In an embodiment, the reaction tubes contain the magnetic beads, and the magnetic beads move within the reaction tubes under a centrifugal force and a magnetic force.

The disclosure places no limitations on the material, shape or capacity of the reaction tubes as long as the movement of the magnetic beads, reactions and operation of a centrifugal device remain unaffected. In an embodiment, the material which the reaction tubes are made of is plastic, glass or steel. The plastic which the reaction tubes are made of is exemplified by polyethylene (PE), polycarbonate (PC) or polypropylene (PP), preferably polypropylene. In a preferred embodiment, to render it easy to assay or monitor reaction intermediates or end products in the reaction tubes, the reaction tubes are made of a light-penetrable and highly transparent material, more preferably an almost transparent material. In an embodiment, the reaction tubes have a capacity of 500 mL, 250 mL, 50 mL, 15 mL, 2 mL, 1.5 mL, 0.65 mL, or 0.2 mL. In an embodiment, to meet experimental needs, the reaction tubes are, for example, conical centrifugal tubes, flat-bottom centrifugal tubes or round-bottom centrifugal tubes, as far as the shape of their bottoms are differently designed.

In an embodiment, each magnetic block and the centrifugal disk are not necessarily connected and thus not necessarily moved together. Thus, each magnetic block and the centrifugal disk are not connected to each other, and the magnetic blocks do not move despite the rotation of the centrifugal disk. The magnetic blocks are disposed on the inner side, outer side, upper side, lower side or a combination thereof of the centrifugal holder. In this embodiment, to avoid hindering the rotation of the centrifugal holder, the magnetic blocks are not disposed on the lateral side of the centrifugal holder. In an embodiment, the magnetic block is an electromagnet, a magnet or a combination thereof. The disclosure places no limitations on the type and shape of the magnets or electromagnets as long as the magnets or electromagnets generate a magnetic force sufficiently great to attract the magnetic beads. In an embodiment, after the reaction tubes have rotated to face different directions, the number of the magnets are not equally positioned in the different directions. For example, with a reference plane being a horizontal plane passing through the centers of the reaction tubes, if the magnets lies over the horizontal plane, there will be an included angle between the direction of a magnetic force of the magnets and the horizontal plane, causing the magnetic beads to shift upward away from the horizontal plane. Conversely, if the magnets lie under the horizontal plane, there will be an included angle between the direction of a magnetic force of the magnets and the horizontal plane, causing the magnetic beads to shift downward away from the horizontal plane. The magnets face different directions relative to the centrifugal disk and thus vary in horizontal or vertical positions, allowing the magnetic beads to move within the reaction tubes vertically and horizontally. Therefore, the specific positions of the magnetic blocks are conducive to the adjustment of the magnetic force of the magnets toward the magnetic beads, thereby controlling the manner in which the magnetic beads move. In an embodiment, a magnetic force is controlled by activating or not activating the electromagnets. Thus, the presence, strength and direction of a magnetic force depend on whether an electrical current passes through the electromagnets or not and the magnitude of the electrical current. The electromagnets control the movement of the magnetic beads in the same way as the magnets do.

In an embodiment, each magnetic block and the centrifugal disk are connected and moved together. Thus, each magnetic block and the centrifugal disk are connected to each other, and thus the magnetic block moves as a result of the rotation of the centrifugal disk. The magnetic blocks are disposed on the inner side, outer side, upper side, lower side, lateral side or a combination thereof of the centrifugal holder. The magnetic blocks are disposed on the lateral side of the centrifugal holder without hindering the rotation of the centrifugal holder. In an embodiment, the magnetic blocks are electromagnets. The operating principle and function of the electromagnets are described above.

In an embodiment, each magnetic block and the centrifugal holder are spaced apart by a distance of 0-300 mm, preferably 0-20 mm, more preferably 0-3 mm. If each magnetic block and the centrifugal holder are spaced apart by an overly large distance, the magnetic force will be insufficient to attract the magnetic beads, and thus the range of motion of the magnetic beads is limited. In the situation where each magnetic block is not connected to the centrifugal disk and thereby not moved together with the centrifugal disk, and thus each magnetic block and the centrifugal holder are spaced apart by a distance preferably less than 10 mm, more preferably less than 5 mm, to prevent wears and tears otherwise caused by contact friction between components because of inconsistency in the movement mode between each magnetic block and the centrifugal disk.

The centrifugal disk of the centrifugal reaction device can be an existing commercially-available centrifugal device. The disclosure places no limitations on the magnitude of the centrifugal force, as long as an appropriate centrifugal device is chosen as needed, and its centrifugal force is adjusted. In an embodiment, the centrifugal force measures 0-80,000 g, preferably 0-12,000 g, and more preferably 0-6,000 g. In a feasible situation, the reaction tubes are existing commercially-available centrifugal tubes and still capable of blending the reaction mixture sufficiently. In a preferred embodiment, given the reaction tubes of the disclosure, a check valve is controlled to open and shut according to the magnitude of the centrifugal force in order to automatically discharge the waste liquid without manual intervention.

The magnetic beads of the centrifugal reaction device are provided in the form of an existing commercially-available product. In a feasible embodiment, the magnetic blocks are additionally disposed in an existing centrifugal device. The magnetic blocks are fixed to the centrifugal device but not moved together with the centrifugal disk. Alternatively, the magnetic blocks are fixed to the centrifugal device and moved together with the centrifugal disk. In an embodiment, the magnetic blocks generate a magnetic force of 1-15,000 Gauss, preferably 1-12,000 Gauss, and more preferably 1-8,000 Gauss. In a feasible embodiment, the magnetic force of the magnetic blocks is of the same or different magnitude.

In an embodiment, the reaction tubes each comprise: at least one reaction region for containing the reaction mixture comprising a reaction reagent, a wash liquid and/or a specimen; and at least one check valve located in a centrifugal direction of the reaction region. When a centrifugal speed or centrifugal force exceeds a threshold, the check valve opens, allowing the reaction mixture to flow in the direction away from the rotating shaft under the centrifugal force so as to exit the reaction region. When the centrifugal speed or centrifugal force is lower than a threshold, the check valve shuts, preventing the reaction mixture from returning to the original reaction region. Since the check valve selectively and repeatedly opens and shuts, the waste liquid can be discharged in multiple instances in the course of a reaction. The reaction tubes may even be partitioned into multiple reaction regions in which reactants composed of biological molecules, for example, proteins or nucleic acids, undergo reactions, such as purification, amplification and analysis.

The "check valve" is a non-return mechanism for controllably keeping a reaction reagent, wash liquid and/or specimen in a reaction region before a centrifugal process starts and allowing the reaction reagent, wash liquid and/or specimen to move unidirectionally to pass through the "check valve" to reach another reaction region as soon as the centrifugal process starts.

The check valve operates by different principles. For example, the check valve can be a mechanical check valve comprising springs of different elastic constants and balls of different weights. The mechanical check valve is made of metal or nonmetal. Centrifugal forces of different magnitudes correspond to valves of different elastic constants, respectively, such that different valves in a reaction microtube open and shut under the centrifugal forces of different magnitudes. Owing to the variety of the magnitudes of the centrifugal forces, a check valve is able to control the retention or discharge of the reaction mixture. In addition, a check valve can electrically control or magnetically control the check valve to open and shut.

For example, when the opening and shutting of the check valve is controlled with a compression spring, a stationary state sees the full extension of the compression spring and the resultant complete closure of the check valve in the absence of the centrifugal process or centrifugal force's failure to develop a compression stress of the spring. If the centrifugal force attains the compression stress of the spring, the compression spring will shorten gradually (because of compression) in response to a gradual increase in the magnitude of the centrifugal force, so as to cause the check valve to open, thereby allowing the reaction mixture to move in a direction away from the rotating shaft to pass through the check valve.

All the waste liquid produced in the reaction process undergoes airtight collection or vacuum collection, depending on the quantity of the waste liquid or whether the reaction microtube has an opening or not. In an embodiment, the waste liquid undergoes airtight collection on the condition that: a centrifugal reaction microtube further comprises a waste liquid region; the check valve and the reaction region are separate, such that the reaction mixture or the wash liquid, which is produced during the reaction, leaves the reaction region as a result of the centrifugal process to reach the waste liquid region without returning.

In an embodiment, the magnetic beads are coated with biological molecules and adapted to enable the reaction mixture to undergo hybridization or adsorption. The biological molecules include antibodies, aptamers, peptides or nucleic acids.

The outer side of each reaction region is adjacent to a heating module to raise the temperature of the reaction region by substantial contact heating. Preferably, the heating module is U-shaped or O-shaped to effectively encircle the reaction region and thereby speed up the heating of the reaction region 111. If the reaction tubes are partitioned into multiple reaction regions, it will be feasible for a heating module to be disposed on at least one side of each reaction region to independently control the reaction temperature in each reaction region. In a feasible embodiment, the centrifugal device comes with an inner side magnetic base, but its outer side magnetic base is replaced by a heating module.

In an embodiment, the centrifugal reaction device further comprises a temperature control module for controlling the reaction temperature in the centrifugal reaction microtube through a heating block, liquid (for example, hot water), gas (for example, hot air), or far infrared rays. Preferably, during the heating process, the heating block and the liquid are arranged in a U-shaped or O-shaped pattern to surround the centrifugal reaction microtube in order to enhance the efficiency of temperature control.

In an embodiment, the centrifugal reaction device further comprises a signal assay module for assaying reaction signals of the centrifugal reaction microtube. For example, the signal assay module is a fluorescent, luminescent or visible light photographic sensing system. Upon completion of the reaction in each reaction region of the centrifugal reaction microtube, biological molecules (for example, antibodies, aptamers, peptides or nucleic acids) for use in marking fluorescent, luminescent or color signals are added to each reaction region to assay the signals and thereby carry out a qualitative or quantitative analysis of the reaction products.

In an embodiment, there are various options for subjecting the magnetic beads to a force, including subjecting the magnetic beads to a magnetic force only, to a centrifugal force only, or to both a magnetic force and a centrifugal force. For exemplary purposes, related specific situations are explained below.

The centrifugal disk does not rotate, and the magnetic blocks generate a magnetic force exclusively dedicated to the magnetic beads.

The centrifugal disk rotates, and the magnetic blocks generate a magnetic force whose magnitude approximates to zero or is negligible, with the magnetic beads being subjected to a centrifugal force only.

The centrifugal disk rotates, and the magnetic blocks generate a magnetic force, with the magnetic beads being subjected to both a magnetic force and a centrifugal force. In an embodiment, the options for subjecting the magnetic beads to a force depend on timing. In an embodiment, the centrifugal disk moves upward, moves downward, and rotates relative to the magnetic blocks to vary its position relative to the magnetic blocks. In an embodiment, with the centrifugal disk not rotating but possibly moving upward or downward, and the magnetic blocks rotating, moving upward or moving downward, the magnetic beads are driven to move and blend the reaction mixture, and then the centrifugal disk rotates to generate a centrifugal force under which the check valve opens, thereby discharging the waste liquid.

In another embodiment, the disclosure provides a centrifugal reaction method comprising the step of introducing a specimen and a reaction reagent to at least one reaction region of the reaction tubes in a centrifugal reaction device to form a reaction mixture. In a preferred embodiment, the specimen comprises fresh or frozen whole blood, serum, plasma, bone marrow, umbilical cord blood, cells, urine, cadaver, tissue, and cell culture. In an embodiment, the reaction reagent is a lysis buffer, binding buffer, wash buffer or elution buffer.

The centrifugal reaction method further comprises the steps of: introducing the magnetic beads to the reaction region; performing a centrifugal process on the reaction tubes under a first centrifugal force so as for a first reaction to occur, wherein the magnetic beads move within the reaction tubes under a force of the sum of a magnetic force of the magnetic block and a centrifugal force. In a preferred embodiment, the first reaction involves exposing nucleic acids in cells or tissue with the lysis buffer. In a preferred embodiment, the reaction method further comprises the step of introducing a binding buffer to promote the binding of the nucleic acids to the magnetic beads. In a preferred embodiment, the reaction method further comprises the step of introducing a wash buffer to not only rinse the nucleic acids, the magnetic beads, and bound substances, but also remove salts and impurities. Owing to variation in directions of a magnetic force acting on the centrifugal holder, the magnetic beads move within the reaction tubes to facilitate sufficient blending and speed up the blending process.

The centrifugal reaction method further comprises the step of performing the centrifugal process on the reaction tubes under a second centrifugal force to cause the check valve to open and thereby discharge the waste liquid of the first reaction. With the grooves disposed in the reaction tubes, the magnetic beads fall into the grooves and thus are not discharged from the reaction tubes via the opened check valve together with the waste liquid. In a feasible embodiment, the second centrifugal force is greater than the first centrifugal force.

The centrifugal reaction method further comprises the step of recovering a product from the magnetic beads. In a preferred embodiment, the reaction method further comprises the step of introducing a wash buffer for rinsing and extracting the product from the magnetic beads. In an embodiment, the product is recycled from the magnetic beads. In an embodiment, the magnetic beads separated from the product are not taken out of the reaction tubes but are adsorbed on the magnetic blocks and thus collected in a specific region in the reaction tubes. In a preferred embodiment, the concentration of the product is assayed with a spectrophotometer in the centrifugal reaction device.

To meet experimental needs, the magnetic beads for use in the centrifugal reaction method are coated with biological molecules including antibodies, aptamers, peptides or nucleic acids. In a preferred embodiment, the magnetic beads are coated with silicon dioxide. In a feasible embodiment, a product produced in the centrifugal reaction method is deoxyribonucleic acid (DNA) or ribonucleic acid (RNA). In a feasible embodiment, polymerase chain reaction or nucleic acid hybridization are performed occurs in the reaction region.

Specific Embodiments of Centrifugal Reaction Device

As shown in FIG. 1, in the first embodiment, a centrifugal reaction device 1 comprises a centrifugal disk 11 and a magnetic block 12. The centrifugal disk 11 comprises a centrifugal shaft 111 and a centrifugal holder 112. The centrifugal shaft 111 is centrally disposed at the centrifugal disk 11. To start a centrifugal process, the centrifugal shaft 111 functions as the rotating shaft for driving the centrifugal disk 11 to rotate. The centrifugal holder 112 is disposed on the centrifugal disk and centered at the centrifugal shaft 111 to surround the centrifugal shaft 111 annularly and symmetrically. The magnetic block 12 is disposed on at least one side of the centrifugal holder 112. The magnetic block 12 disposed on the inner side of the centrifugal holder 112 and positioned proximal to the centrifugal shaft is an inner side magnetic block 121. The magnetic block 12 disposed on the outer side of the centrifugal holder 112 and positioned distal to the centrifugal shaft is an outer side magnetic block 122. In the first embodiment, the magnetic block 12 does not move together with the centrifugal disk 11. Thus, during the centrifugal process, the magnetic block 12 does not move in response to the rotation of the centrifugal disk 11. The centrifugal reaction device 1 may further comprises a reaction tube 13 and at least one magnetic bead 14. Preferably, the reaction tube 13 is detachably disposed on the centrifugal holder 112. During the centrifugal process, the reaction tube 13 disposed on the centrifugal holder 112 moves in response to the rotation of the centrifugal disk 11. The at least one magnetic bead 14 is disposed in the reaction tube. During the centrifugal process, the magnetic beads disposed in the reaction tube 13 move when the reaction tube 13 rotates together with the centrifugal disk 11.

Figure 2:
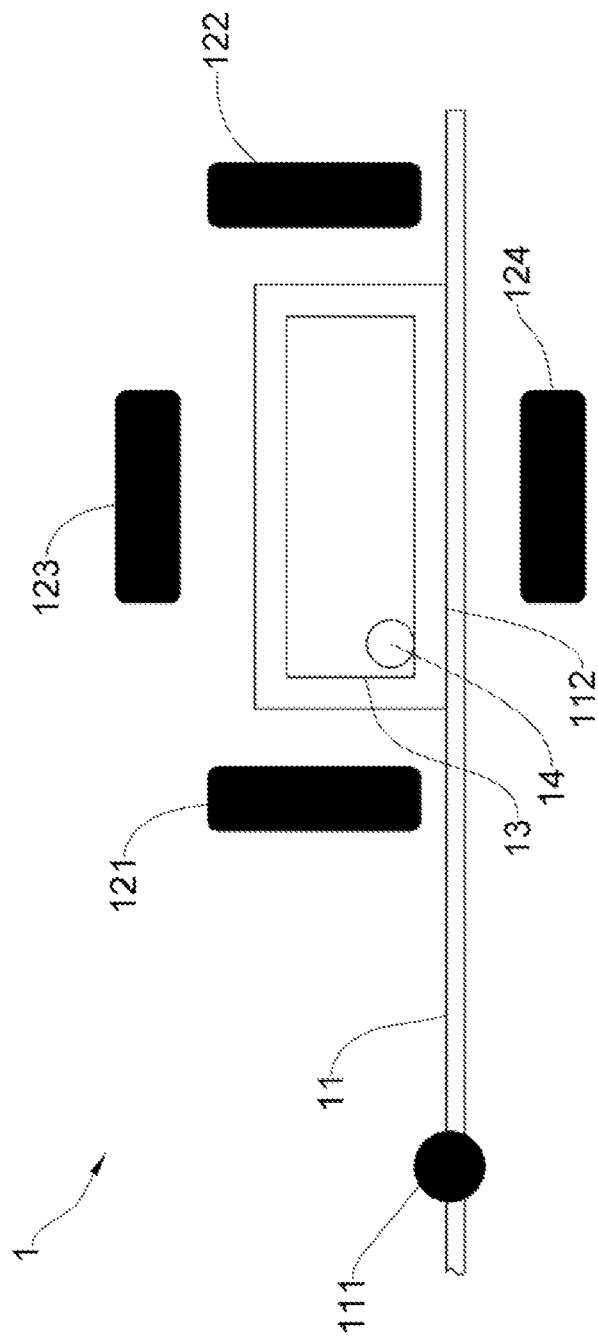
FIG. 2 is a cross-sectional view of the centrifugal reaction device according to the first embodiment of the disclosure.

FIG. 2 is a cross-sectional view taken along the dashed line of FIG. 1. As shown in FIG. 2, in the first embodiment, the magnetic block 12 further comprises an upper side magnetic block 123 and a lower side magnetic block 124. The magnetic block 12 disposed on the upper side of the horizontal plane of the centrifugal holder 112 is the upper side magnetic block 123. The magnetic block 12 disposed on the lower side of the horizontal plane of the centrifugal holder 112 is the lower side magnetic block 124. In the first embodiment, the magnetic block 12 does not move together with the centrifugal disk 11. Thus, during the centrifugal process, the upper side magnetic block 123 and the lower side magnetic block 124 do not rotate together with the centrifugal disk 11.

Figure 3:
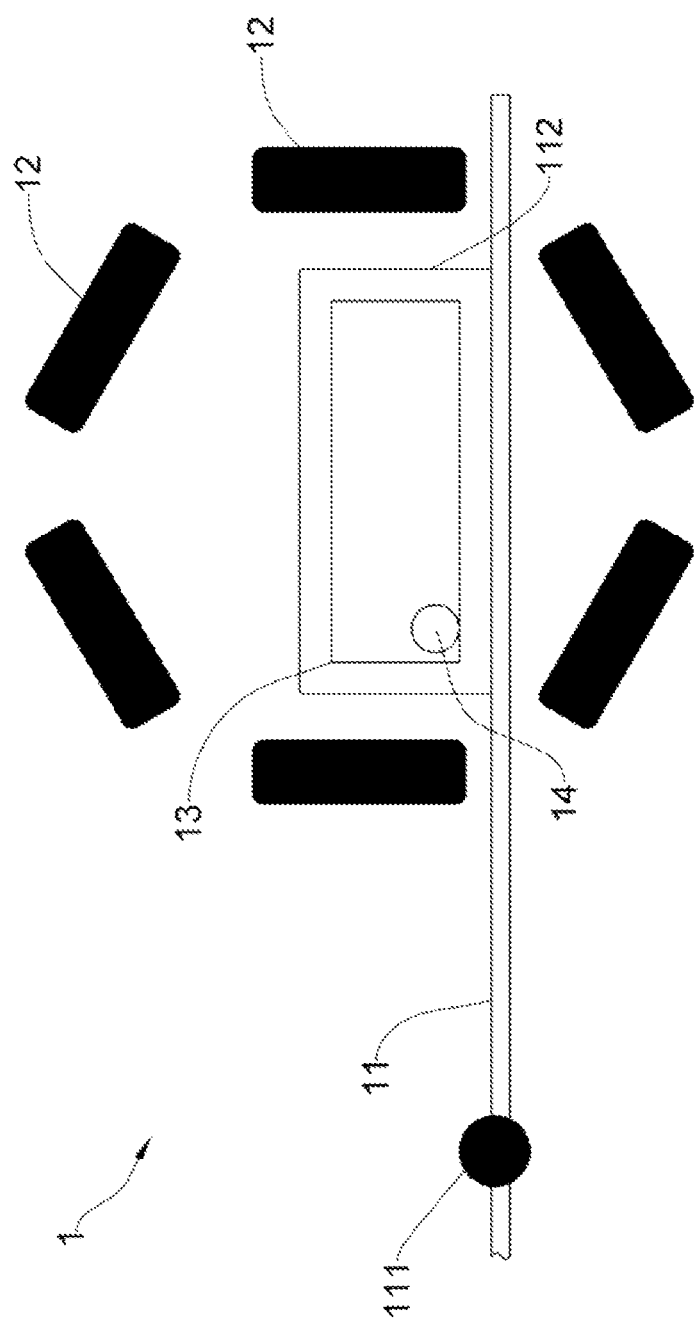
FIG. 3 is a cross-sectional view of the centrifugal reaction device according to the second embodiment of the disclosure.

As shown in FIG. 3, in the second embodiment, the magnetic blocks 12 of the centrifugal reaction device 1 are not necessarily disposed on the upper, lower, inner and outer sides of the centrifugal disk 11. To precisely and delicately control the way of moving the magnetic beads 14 within the reaction tube 13, the magnetic blocks 12 are disposed on and centered at the centrifugal holder 112 and positioned in different directions of the centrifugal holder 112 as needed. In a feasible embodiment, six said magnetic blocks 12 disposed on the centrifugal holder 112 are spaced apart from each other by 60 degrees about the center of the centrifugal holder 112, when viewed from the section taken along the line connecting the centrifugal holder 112 and the rotating shaft.

Figure 4:
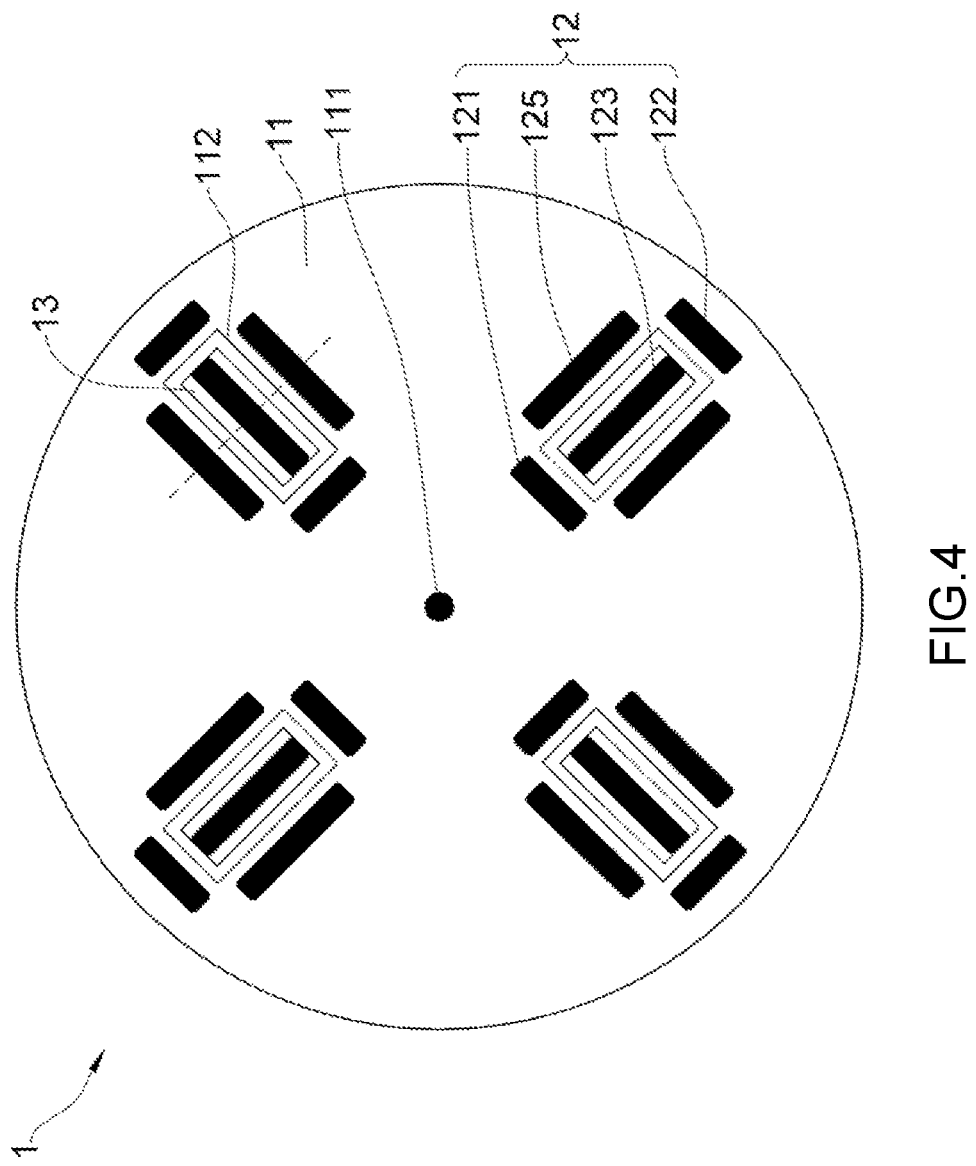
FIG. 4 is a top view of the centrifugal reaction device according to the third embodiment of the disclosure.

As shown in FIG. 4, in the third embodiment, the centrifugal reaction device 1 comprises a centrifugal disk 11 and a magnetic block 12. The centrifugal disk 11 comprises the centrifugal shaft 111 and the centrifugal holder 112. The centrifugal shaft 111 is centrally disposed at the centrifugal disk 11. To start a centrifugal process, the centrifugal shaft 111 functions as the rotating shaft for driving the centrifugal disk 11 to rotate. The centrifugal holder 112 is disposed on the centrifugal disk 11 and centered at the centrifugal shaft 111 to surround the centrifugal shaft 111 annularly. The magnetic blocks 12 are disposed on at least one side of the centrifugal holder 112. The magnetic block 12 disposed on the inner side of the centrifugal holder 112 and positioned proximal to the centrifugal shaft is the inner side magnetic block 121. The magnetic block 12 disposed on the outer side of the centrifugal holder 112 and positioned distal to the centrifugal shaft 111 is the outer side magnetic block 122. The magnetic block 12 disposed on the lateral side of the centrifugal holder 112 is a lateral side magnetic block 125. In the fourth embodiment, the magnetic blocks 12 move together with the centrifugal disk 11. Thus, during the centrifugal process, the magnetic blocks 12 move in response to the rotation of the centrifugal disk 11. The centrifugal reaction device 1 further comprises a reaction tube 13 and at least one magnetic bead 14. The reaction tube 13 is detachably disposed on the centrifugal holder 112. During the centrifugal process, the reaction tube 13 disposed on the centrifugal holder 112 moves in response to the rotation of the centrifugal disk 11. The at least one magnetic bead 14 is disposed in the reaction tube 13. During the centrifugal process, the magnetic beads disposed in the reaction tube 13 move when the reaction tube 13 rotates together with the centrifugal disk 11.

Figure 5:
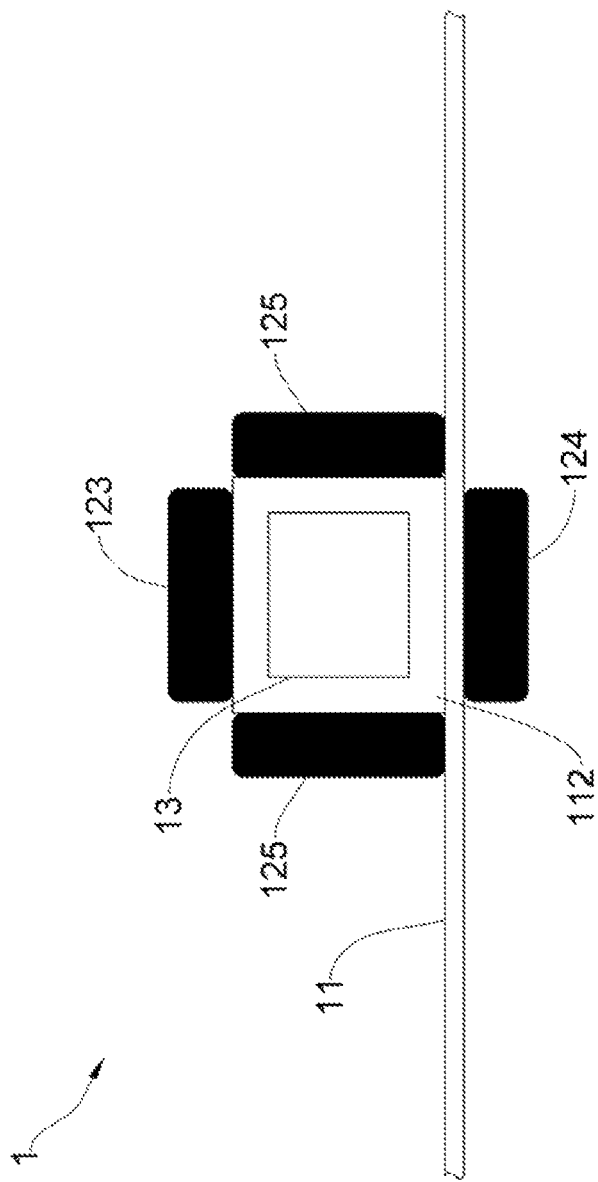
FIG. 5 is a cross-sectional view of the centrifugal reaction device according to the third embodiment of the disclosure.

FIG. 5 is a cross-sectional view of the centrifugal reaction device taken along the dashed line in FIG. 4. As shown in FIG. 5, in the third embodiment, the magnetic blocks 12 further comprises an upper side magnetic block 123 and a lower side magnetic block 124. The magnetic block 12 disposed on the upper side of the horizontal plane of the centrifugal holder 112 is the upper side magnetic block 123. The magnetic block 12 disposed on the lower side of the horizontal plane of the centrifugal holder 112 is the lower side magnetic block 124. In the third embodiment, the magnetic blocks 12 move together with the centrifugal disk 11. Thus, during the centrifugal process, the upper side magnetic block 123 and the lower side magnetic block 124 move in response to the rotation of the centrifugal disk 11.

Figure 6:
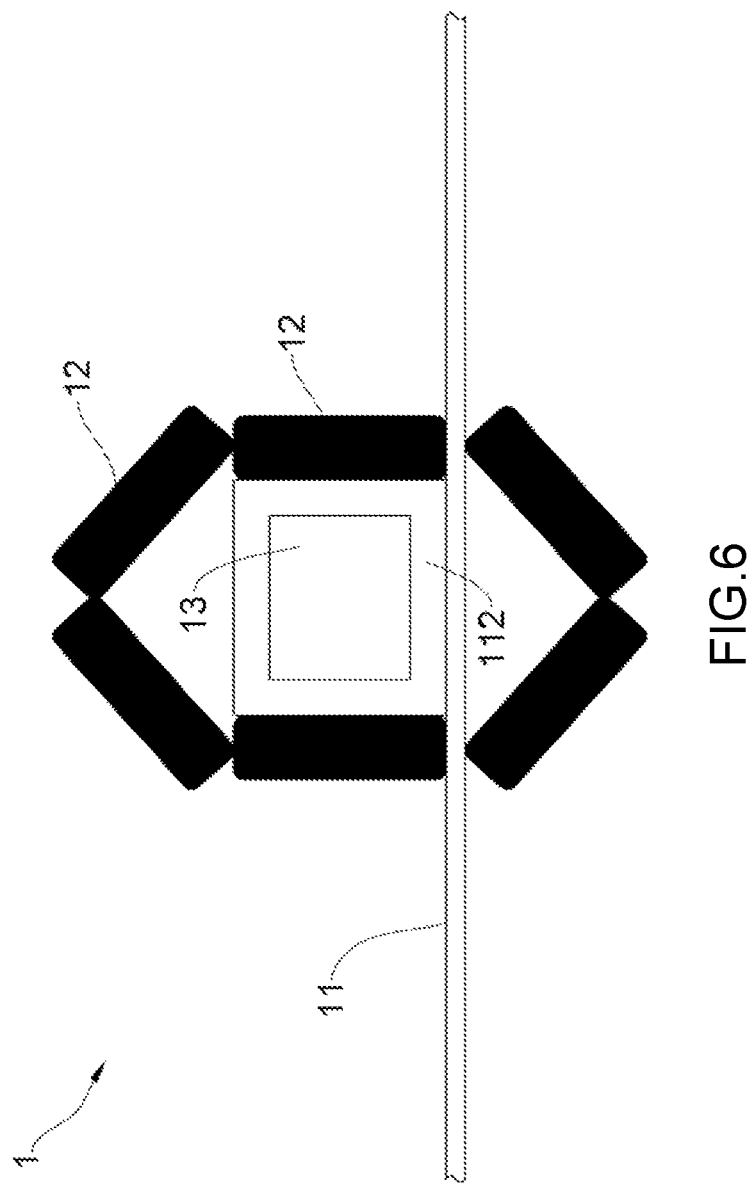
FIG. 6 is a cross-sectional view of the centrifugal reaction device according to the fourth embodiment of the disclosure.

As shown in FIG. 6, in the fourth embodiment, the magnetic blocks 12 of the centrifugal reaction device 1 are not necessarily disposed on the upper, lower, inner, outer, and lateral sides of the centrifugal holder 112. To precisely and delicately control the way of moving the magnetic beads 14 within the reaction tube 13, the magnetic blocks 12 are disposed on and centered at the centrifugal holder 112 and positioned in different directions of the centrifugal holder 112 as needed. In a feasible embodiment, six said magnetic blocks 12 disposed on the centrifugal holder 112 are spaced apart from each other by 60 degrees about the center of the centrifugal holder 112, when viewed from the plane perpendicular to the line connecting the centrifugal holder 112 and the rotating shaft.

Figure 7:
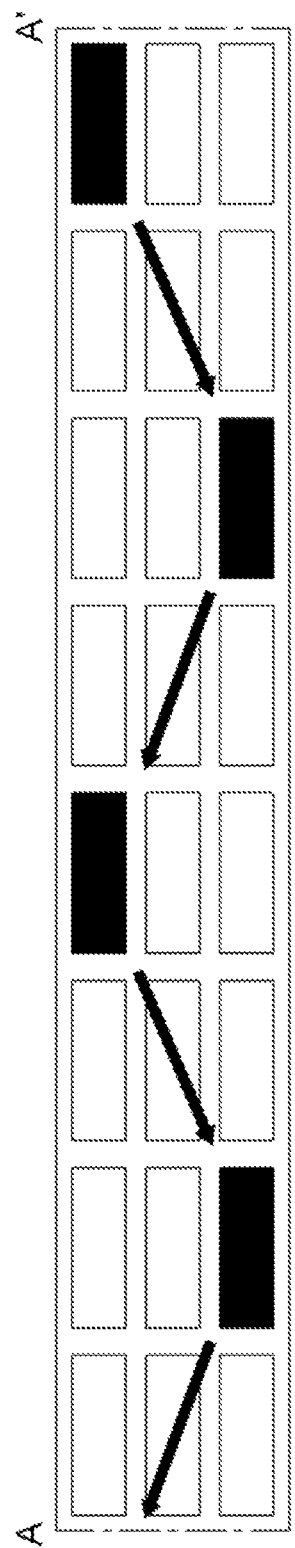
FIG. 7 is a schematic view of how magnets are arranged in outer magnetic blocks according to the first embodiment of the disclosure. A and A' are connected, and the three-dimensional structures of the outer magnetic blocks are cylindrical in shape. Magnets are disposed in solid-cored blocks but not in hollow-cored blocks. The directions in which magnetic beads move are indicated by arrows.
Figure 8:
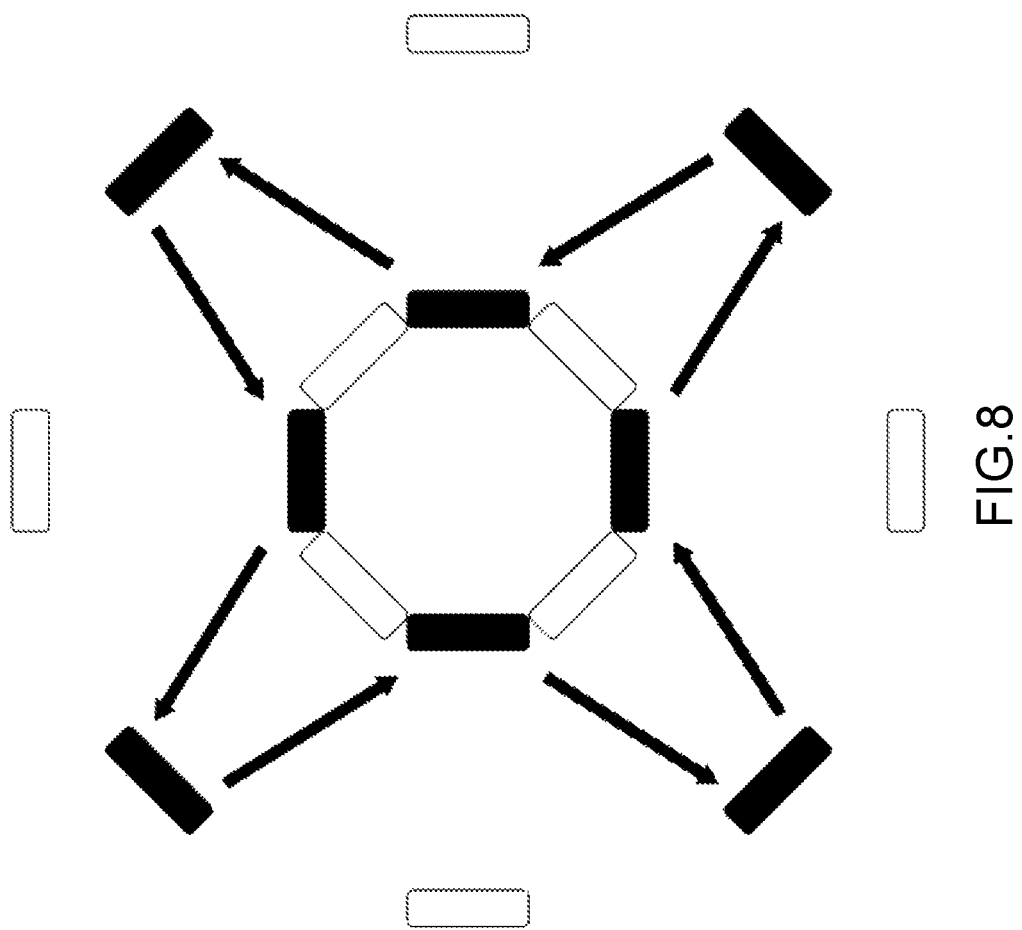
FIG. 8 is a schematic view of how magnets are arranged in inner and outer magnetic blocks according to the first embodiment of the disclosure. The outer magnetic blocks surround at the outer side, and the inner magnetic blocks surround at the inner side. Magnets are disposed in solid-cored blocks but not in hollow-cored blocks. The directions in which the magnetic beads move are indicated by arrows.

In the first embodiment, the magnetic blocks 12 are magnets. In a feasible embodiment, the magnets disposed in the inner magnetic block 121 or outer magnetic block 122 are arranged in eight horizontal rows and three vertical columns and numbered in counterclockwise order as "row m column n" (m-n). In a specific embodiment, the magnets are disposed at row 1 column 1 (1-1), row 3 column 3 (3-3), row 5 column 1 (5-1), and row 7 column 3 (7-3) of the outer magnetic blocks as well as row 2 column 2 (2-2), row 4 column 2 (4-2), row 6 column 2 (6-2), and row 8 column 2 (8-2) of the inner magnetic block, but no magnets are disposed in the other magnetic blocks. The magnetic beads 14 disposed in the reaction tube 13 move in response to the counterclockwise rotation of the reaction tube 13 and the centrifugal holder. As the reaction tube 13 rotates to face different directions, the magnetic beads 14 are attracted to the magnets in the inner and outer magnetic blocks facing different directions. Specifically speaking, when the centrifugal holder 112 rotates counterclockwise, the magnetic beads 14 pass through the magnet at row 1 column 1 (1-1) of the outer magnetic block. For example, the included angle between the direction of a magnetic force generated by magnet (1-1) and the horizontal plane is +30 degrees, allowing the magnetic beads to shift outward and upward. Then, the magnetic beads 14 pass through the magnet at row 2 column 2 (2-2) of the inner magnetic block. The direction of a magnetic force generated by magnet (2-2) is parallel to the horizontal plane; thus, the included angle between the direction of the magnetic force generated by magnet (2-2) and the horizontal plane is 0 degree, allowing the magnetic beads to shift inward and downward and approach the horizontal plane. Then, the magnetic beads 14 pass through the magnet at row 3 column 3 (3-3) of the outer magnetic block. The included angle between the direction of a magnetic force generated by magnet (3-3) and the horizontal plane is −30 degrees, allowing the magnetic beads to shift outward and downward. By analogy, the magnetic beads move upward, downward, inward and outward together with the magnets they pass through. After the reaction tube 13 has rotated by one revolution and returned to its original position, the magnetic beads 14 undergo reciprocating motion between the inner and outer sides four times and undergo reciprocating motion between the upper and lower sides twice. The specific arrangement of magnets disposed in magnetic blocks in the aforesaid situation is shown in FIG. 7 and FIG. 8.

In another feasible embodiment, the magnets disposed in the outer magnetic block or inner magnetic block are arranged in six horizontal rows and three vertical columns and numbered in counterclockwise order as "row m column n" (m-n). In a specific embodiment, the magnets are disposed at row 1 column 3 (1-3), row 3 column 2 (3-2), and row 5 column 1 (5-1) of the outer magnetic block as well as row 2 column 3 (2-3), row 4 column 2 (4-2), and row 6 column 1 (6-1) of the inner magnetic block, but no magnets are disposed in the other magnetic blocks. The magnetic beads 14 disposed in the reaction tube 13 move in response to the counterclockwise rotation of the reaction tube 13 and the centrifugal holder. As the reaction tube 13 rotates to face different directions, the magnetic beads 14 are attracted to the magnets in the inner and outer magnetic blocks facing different directions. Specifically speaking, when the centrifugal holder 112 rotates counterclockwise, the magnetic beads 14 pass through the magnet at row 1 column 3 (1-3) of the outer magnetic block. For example, the included angle between the direction of a magnetic force generated by the magnet (1-3) and the horizontal plane is −30 degrees, allowing the magnetic beads to shift outward and downward. Then, the magnetic beads 14 pass through the magnet at row 2 column 3 (2-3) of the inner magnetic block. The included angle between the direction of a magnetic force generated by magnet (2-3) and the horizontal plane is −30 degrees, allowing the magnetic beads to shift inward but stay in the middle and lower portions of the reaction tube 13. Then, the magnetic beads 14 pass through the magnet at row 3 column 2 (3-2) of the outer magnetic block. The direction of a magnetic force generated by magnet (3-2) is parallel to the horizontal plane, and thus the included angle between the direction of the magnetic force generated by magnet (3-2) and the horizontal plane is 0 degree, allowing the magnetic beads to shift outward and upward and approach the horizontal plane. By analogy, the magnetic beads move upward, downward, inward and outward together with the magnets they pass through. After the reaction tube 13 has rotated by one revolution and returned to its original position, the magnetic beads 14 undergo reciprocating motion between the inner and outer sides thrice and undergo reciprocating motion between the upper and lower sides once. The arrangement of the magnets in the magnetic blocks in horizontal rows and vertical columns is described above, but persons skilled in the art are able to adjust the arrangement of the magnets in the magnetic blocks as needed, including adjusting the numbers and locations of the horizontal rows and vertical columns, thereby not being limited by the aforesaid description.

In the third or fourth embodiments, with the magnetic blocks moving together with the reaction tube, the electromagnets are preferably disposed in the magnetic blocks 12. Therefore, the embodiments are effective in controlling whether a magnetic force of the electromagnets is present or not, allowing a magnetic force direction to vary as the centrifugal holder rotates to face different directions.

Specific Embodiments of Centrifugal Reaction Method

1) Take 1-200 μL of a specimen to be assayed (for example, a cultured cell sample) out of a specimen chamber (for example, 1.5 mL centrifugal tube or 96-well plate) and add the 1-200 μL of the specimen to be assayed to a reaction tube;

2) Take 1-200 μL of a lysis buffer out of a reagent reservoir (for example, 1.5 mL centrifugal tube) and add the 1-200 μL of the lysis buffer to the reaction tube;

3) Carry out a centrifugal process at low speed (for example, under a centrifugal force of 0.05-10 g), and allow the specimen and the lysis buffer to mix in the reaction regions, thereby allowing the check valve to shut;

4) Take 1-20 μL of the magnetic beads out of a reagent reservoir (for example, 1.5 mL centrifugal tube) and add the 1-20 μL of the magnetic beads to the reaction tube;

5) Take 1-200 μL of a binding buffer out of a reagent reservoir (for example, 1.5 mL centrifugal tube) and add the 1-200 μL of the binding buffer to the reaction tube;

6) Carry out a centrifugal process at low speed (for example, under a centrifugal force of 0.05-10 g), such that nucleic acids released from the specimen and the magnetic beads are mixed by the binding buffer in the reaction regions, thereby allowing the check valve to shut;

7) Allow the magnetic beads attracted to magnetic blocks to fall into grooves of the reaction tube, and then carry out a centrifugal process at high speed (for example, under a centrifugal force of 100-500 g) to open the check valve, so as to discharge impurities in the mixture and the buffers from the reaction regions;

8) Take 1-200 μL of a wash buffer out of a reagent reservoir (for example, 1.5 mL centrifugal tube) and add the 1-200 μL of the wash buffer to the reaction tube;

9) Carry out a centrifugal process at low speed (for example, 0.05-10 g of centrifugal force), such that the magnetic beads which the nucleic acids are bound to and the wash buffer are mixed in the reaction regions, thereby allowing the check valve to shut;

10) Allow the magnetic beads attracted to the magnetic blocks to fall into grooves of the reaction tube, and then carry out a centrifugal process at high speed (for example, under a centrifugal force of 100-500 g) to open the check valve, so as to discharge impurities in the mixture and the buffers from the reaction regions;

11) Take 1-200 μL of an elution buffer out of a reagent reservoir (for example, 1.5 mL centrifugal tube) and add the 1-200 μL of the elution buffer to the reaction tube;

12) Carry out a centrifugal process at low speed (for example, under a centrifugal force of 0.05-10 g), such that the magnetic beads which the nucleic acids are bound to and the elution buffer are mixed in the grooves of the reaction tube, thereby allowing the check valve to remain shut;

13) Allow the magnetic beads to be attracted to the magnetic blocks, thereby allowing the magnetic beads to gather in the reaction tube, be positioned proximal to the centrifugal shaft, and be fixed in place;

14) Assay the concentration of the nucleic acid with a spectrophotometer in a centrifugal reaction device.

Therefore, the centrifugal reaction device and its centrifugal reaction method of the disclosure are effective in carrying out a molecular biological reaction in a one-touch manner. Under a centrifugal force and a magnetic force, magnetic beads are driven to move and allow a reaction mixture to be sufficiently mixed in a short period of time. The centrifugal force and a reaction tube are conducive to miniaturization of a molecular biological assay machine, so as to save energy, save space, and shorten an assay process greatly. Furthermore, a reaction process dispenses with the hassle of switching between different machines, so as to enhance ease of use, ensure quick and safe operation, save energy, augment assay precision, achieve cost-effectiveness, and prevent contamination.

The aforesaid embodiments of the disclosure are illustrative rather restrictive. All equivalent amendments and changes made to the aforesaid embodiments of the disclosure without departing from the spirit and scope of the disclosure shall fall within the scope of the appended claims.

What is claimed is:

1. A centrifugal reaction device, comprising:
   a centrifugal disk comprising a centrifugal shaft and at least a centrifugal holder, with the centrifugal holder disposed annularly about the centrifugal shaft;
   a plurality of outer magnetic blocks disposed on an outer side of the centrifugal holder;
   a plurality of inner magnetic blocks disposed on an inner side of the centrifugal holder, wherein the inner magnetic blocks and the outer magnetic blocks are interspersed circumferentially and are radially non-overlapping;
   wherein the centrifugal holder detachably holds a reaction tube, and the reaction tube contains magnetic beads,
   wherein the magnetic beads move within the reaction tube under a force of the sum of a magnetic force and a centrifugal force.

2. The centrifugal reaction device of claim 1, wherein the inner and outer magnetic blocks and the centrifugal disk are not connected and thus do not move together.

3. The centrifugal reaction device of claim 2, wherein the inner and outer magnetic blocks are each an electromagnet, a magnet or a combination thereof.

4. The centrifugal reaction device of claim 1, wherein the inner and outer magnetic blocks and the centrifugal disk are connected and thus move together.

5. The centrifugal reaction device of claim 4, wherein at least one of the inner and outer magnetic blocks is an electromagnet.

6. The centrifugal reaction device of claim 1, wherein the inner and outer magnetic blocks and the centrifugal disk are spaced apart by a distance of 0-300 mm.

7. The centrifugal reaction device of claim 1, wherein the centrifugal force measures 1-80,000 g.

8. The centrifugal reaction device of claim 1, wherein the magnetic force of at least one of the inner and outer magnetic blocks measures 1-15,000 Gauss.

9. The centrifugal reaction device of claim 1, wherein the reaction tube comprises at least one reaction region and at least one check valve.

10. The centrifugal reaction device of claim 9, wherein the at least one check valve of the reaction tube is electrically controlled or magnetically controlled to open and shut.

11. The centrifugal reaction device of claim 1, wherein the magnetic beads are coated with biological molecules including antibodies, aptamers, peptides or nucleic acids.

12. A centrifugal reaction method, comprising the steps of:
   introducing at least one of a specimen and/or a reaction reagent into at least a reaction region of the reaction tube in the centrifugal reaction device of claim 1 to form a reaction mixture;
   introducing the magnetic beads into the reaction region;
   performing a centrifugal process on the reaction tube under a first centrifugal force to start a first reaction, wherein the magnetic beads move within the reaction tube under a force of the sum of a magnetic force and a centrifugal force;
   performing a centrifugal process on the reaction tube under a second centrifugal force to open a first check valve and thereby discharge a waste liquid of the first reaction, wherein the second centrifugal force is greater than the first centrifugal force.

13. The method of claim 12, further comprising introducing a wash buffer to remove impurities.

14. The method of claim 12, further comprising recovering a product from the magnetic beads.

15. The method of claim 12, wherein the magnetic beads are coated with biological molecules including antibodies, aptamers, peptides or nucleic acids.

16. The method of claim 15, wherein the magnetic beads are coated with silicon dioxide.

17. The method of claim 14, wherein the product is deoxyribonucleic acid (DNA) or ribonucleic acid (RNA).

18. The method of claim 12, wherein polymerase chain reaction is performed in the reaction region.

19. The method of claim 12, wherein nucleic acid hybridization is performed in the reaction region.

* * * * *